United States Patent [19]

Kubo et al.

[11] Patent Number: 4,729,521

[45] Date of Patent: Mar. 8, 1988

[54] CONTROLLER FOR WINDING UNVULCANIZED RUBBER SHEET

[75] Inventors: Masayoshi Kubo; Hideaki Katayama; Kenji Tokunaga, all of Nagasaki; Megumi Yamanaka, Osaka; Hisanobu Inada, Sennan, all of Japan

[73] Assignees: Mitsubishi Jukogyo Kabushiki Kaisha, Tokyo; Bando Chemical Industries, Inc., Hyogo, both of Japan

[21] Appl. No.: 946,139

[22] Filed: Dec. 29, 1986

Related U.S. Application Data

[63] Continuation of Ser. No. 724,419, Apr. 16, 1985, abandoned.

[51] Int. Cl.[4] ............... B65H 18/10; B65H 23/198; B29D 30/30
[52] U.S. Cl. ............... 242/67.2; 242/75.51; 156/406
[58] Field of Search ............ 242/75.51, 67.2, 56 R, 242/55; 156/405.1, 406.6, 406, 394.1, 130.3, 130.7, 123 R

[56] References Cited

U.S. PATENT DOCUMENTS

| 3,717,529 | 2/1973 | Rattray et al. | 156/405.1 X |
| 3,728,181 | 4/1973 | Simmons | 156/405.1 X |
| 4,280,081 | 7/1981 | Dinger et al. | 242/75.51 X |
| 4,366,371 | 12/1982 | d'Arc | 242/75.51 X |
| 4,474,338 | 10/1984 | Hirano et al. | 156/405.1 X |

FOREIGN PATENT DOCUMENTS

| 57-46880 | 3/1982 | Japan | 156/405.1 |
| 58-38144 | 5/1983 | Japan . | |

Primary Examiner—John M. Jillions
Attorney, Agent, or Firm—Birch, Stewart, Kolasch and Birch

[57] ABSTRACT

A controller for winding an unvulcanized rubber sheet suitable for the formation of tires, transmitting belts and the like comprises a cylindrical drum rotated by a motor for winding the unvulcanized rubber sheet thereon, a conveyer for feeding the unvulcanized rubber sheet on the drum, a data processor for calculating a ratio of peripheral velocities of the drum and the feeding conveyer and a feeding quantity of the unvulcanized rubber sheet on the basis of previously inputted data and a sequence control unit responsive to an output of the data processor for controlling the sequence of operation of the movable portions of the controller, i.e. the sequence according to which each element of the controller for winding the unvulcanized rubber sheet and the motors are operated, which sequence is established according to a predetermined order.

2 Claims, 6 Drawing Figures

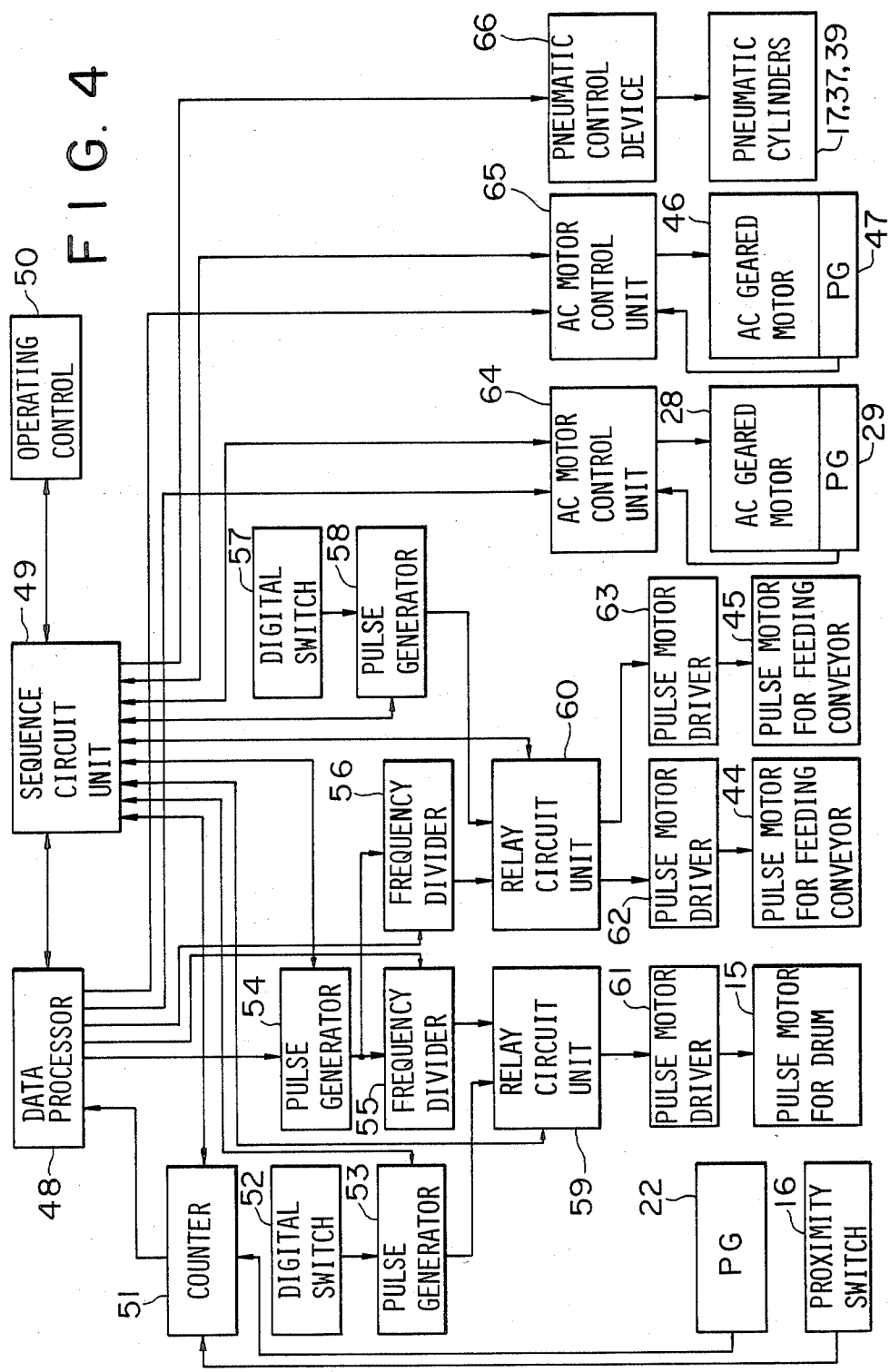

CONTROLLER FOR WINDING UNVULCANIZED RUBBER SHEET

This is a continuation of application Ser. No. 724,419, filed Apr. 16, 1985 and now abandoned.

BACKGROUND OF THE INVENTION (i) Field of the Invention

The present invention relates to a controller for winding an unvulcanized rubber sheet, and more particularly to a controller for winding an unvulcanized rubber sheet for use in molding tires or transmitting belts such as V belts, flat belts and serrated toothed belts.

(ii) Description of the Prior Art

Heretofore, when an unvulcanized rubber sheet or an unvulcanized rubber sheet containing cloth, cords or short fibers (hereinafter referred to as an unvulcanized rubber sheet in general) is wound on a drum having a cylindrical outer periphery, an operator draws out the unvulcanized rubber sheet through a plyservicer to attach an end of the rubber sheet to the surface of the drum, rotates the drum a predetermined distance to wind the rubber sheet and then cuts the rubber sheet. Accordingly, there are drawbacks that much labor is required and the productivity and the quality thereof are greatly dependent on the skill of the operator.

In order to remove the drawbacks and improve the operation, there have been proposed many techniques such as a method for winding an unvulcanized rubber sheet previously cut in a predetermined length on a drum and a method disclosed in Japanese Patent Application Laid-open No. 58-38144/83. However, in either case, since a drum having a constant peripheral length is used for a given period of time, it becomes necessary to change the setting condition such as the length of winding the rubber sheet on the drum when the peripheral length of the drum is varied. Accordingly, when the peripheral length of the drum is frequently changed as in the case when the length of the wound rubber sheet is to be used in the molding of a transmitting belt which is a product of various types but manufactured in a small quantity, the actual rate or efficiency of operation of the facilities and operators is remarkably reduced and the rate of occurrence of defective products due to mistakes in the various setting conditions is increased. The reference to setting conditions means those certain requirements in the way of operation which correspond to the specification of the product, for example, the product's type number, material number (Mn), its supply location P, length of winding, thickness (Mt) of rubber sheet, number (M) of wound layers and the drum number in use. These requirements are to be inputted and stored in a data processor as further discussed below.

SUMMARY OF THE INVENTION

The present invention is proposed in view of the above drawbacks of the prior art. An object of the present invention is to resolve the above drawbacks in the prior art and provide a controller for winding an unvulcanized rubber sheet capable of always attaining the correct winding operation of the rubber sheet automatically consistent with the variation of the setting condition in a highly efficient manner while preventing the occurrence of mistakes on the part of the operator.

Accordingly, the subject matter of the present invention resides in a controller for winding an unvulcanized rubber sheet comprising a cylindrical drum rotated by a motor for winding the unvulcanized rubber sheet thereon, a conveyer for feeding the unvulcanized rubber to the drum, a data processor for calculating a ratio of peripheral velocities of the drum and the feeding conveyer and the feeding quantity of the unvulcanized rubber sheet on the basis of previously inputted data and a sequence control unit responsive to an output of the data processor for controlling the sequence of operation of the movable portions of the controller, i.e. the sequence according to which each element of the controller for winding the unvulcanized rubber sheet and the motors are operated, which sequence is established according to a predetermined order.

Briefly explaining the controller for winding the unvulcanized rubber sheet, one or both of the drum and the feeding conveyer are driven by a DC servomotor or a pulse motor capable of changing the speed of rotation thereof continuously so that the peripheral velocities of the drum and the conveyer are electrically synchronized with each other. The variation of the setting conditions of the mechanical movable portion of the controller is made by a data processor on the basis of a previously inputted sequence order for the subsequent molding operation in tires and/or belts and the necessary data. With the controller so constructed, the subsequent molding operation in which the setting condition is varied for each operating cycle can be practiced in a highly efficient manner and the occurrence of mistakes such as a wrong setting of a condition by the operator can be prevented. Further, the outer peripheral length of the drum (or the peripheral length corresponding to the length of a material attached on the drum) is measured in advance before the rubber sheet is wound on the drum, and the winding length is automatically calculated on the basis of the measured data to set the calculated length. Thus, the peripheral length of the drum or the thickness of the material previously attached on the drum is automatically corrected so that a more exact winding operation can be practiced.

With the above construction being provided in the present invention, the following effects are achieved.

According to the present invention, even if the setting conditions relating to the outer peripheral length of the drum, for example, are varied for each operating cycle, the high efficiency can be maintained by the automatic control and the correct winding operation can be always realized. Therefore, any occurrence of operating error by the operator can be effectively prevented.

BRIEF DESCRIPTION OF THE DRAWINGS

FIG. 4 is a block diagram showing a necessary part of a controller according to an embodiment of the present invention.

DETAILED DESCRIPTION OF A PREFERRED EMBODIMENT

An embodiment of the present invention will now be described in detail with reference to the accompanying drawings.

Figure 1:
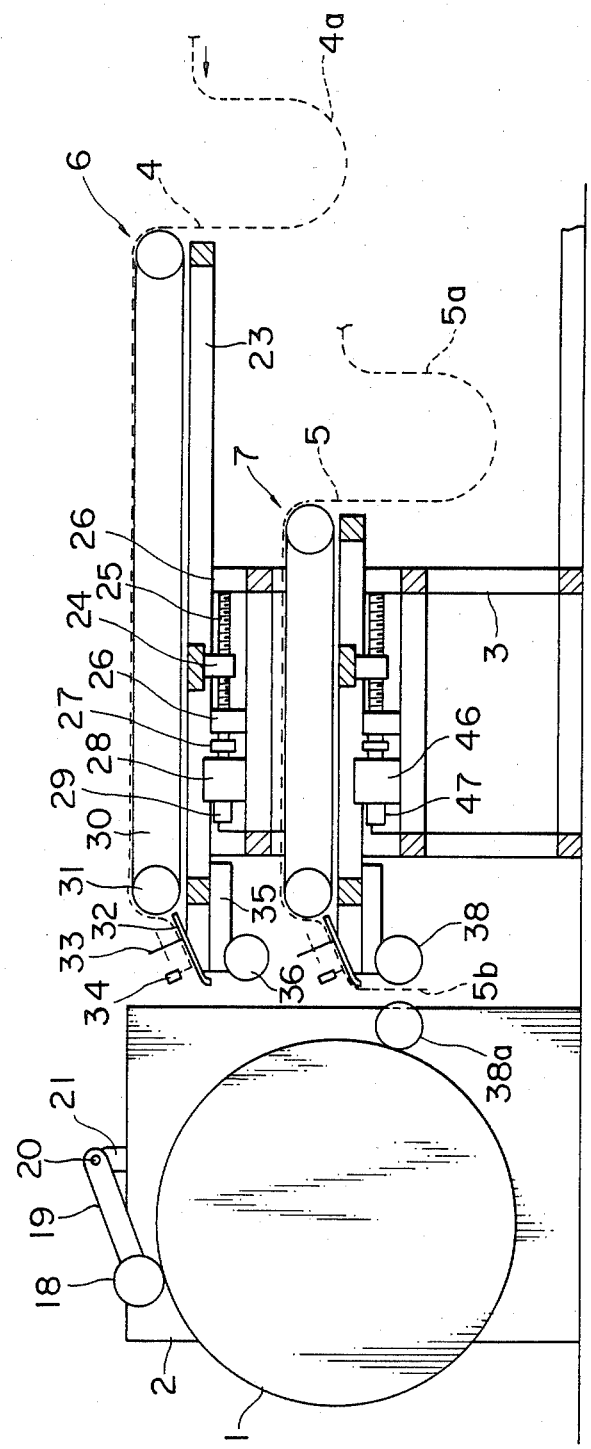
FIG. 1 is a cross sectional side view of a portion showing the configuration of an embodiment of the present invention.
Figure 2:
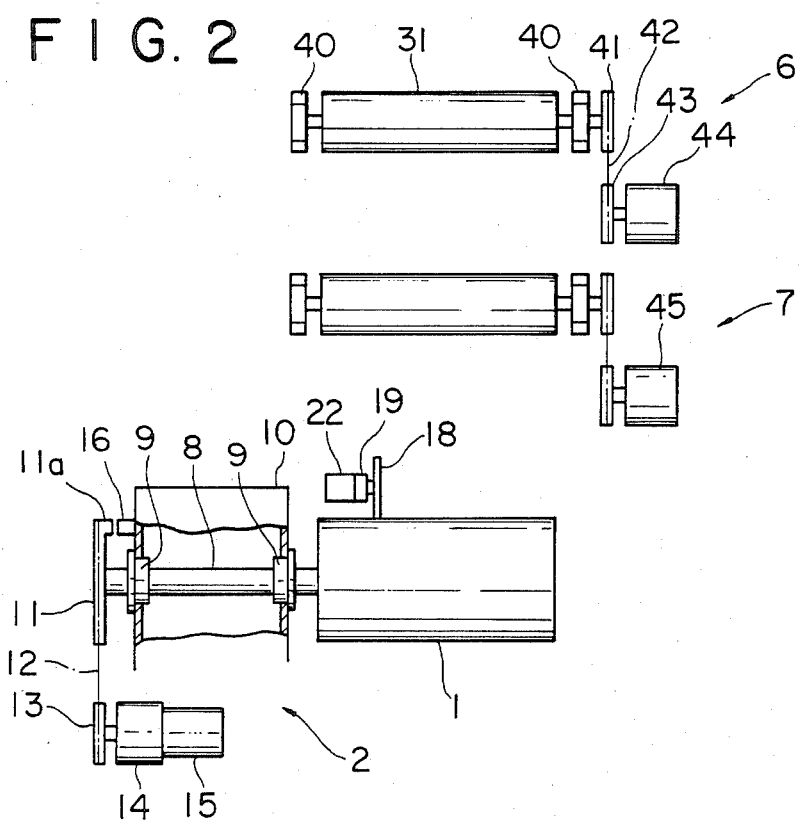
FIG. 2 shows a drive mechanism for winding the unvulcanized rubber sheet as viewed from the front side in FIG. 1.
Figures 3A, 3B, 3C:
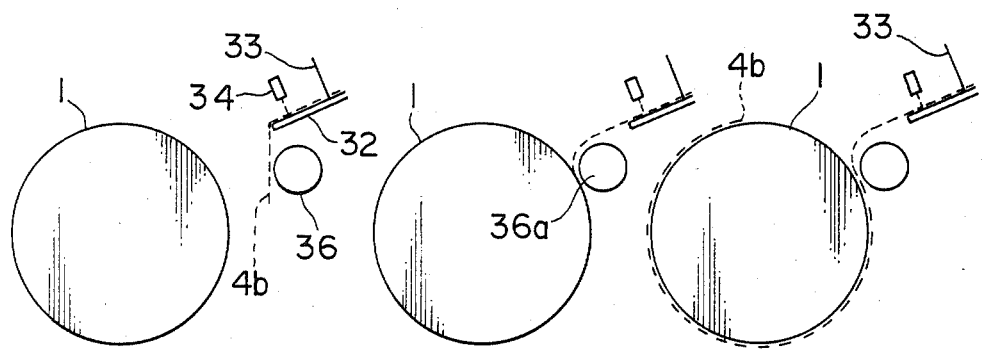
FIGS. 3(A), (B) and (C) show the winding procedure of the unvulcanized rubber sheet according to an embodiment of the present invention.

Referring to FIGS. 1 to 4, there is provided a drum 1 having an actual outer periphery for the molding operation, a head stock 2 for rotatably supporting the drum 1 and including a drive unit for rotating the drum 1, a fixed frame 3 for a servicer, and unvulcanized rubber sheets 4 and 5, respectively. Generally, a plurality of types of rubber sheets (two types of rubber sheets are shown) are provided and one or a plurality of types of the rubber sheets are wound on the drum 1 depending on the specification of the product. Feeding units 6 and 7 are provided for the rubber sheets 4 and 5, respectively. In the figure, only two sets of feeding units are provided but this can be increased or decreased if desired.

The head stock 2 comprises a head stock housing 10, having a main shaft 8 which is rotatably supported to the head stock housing 10 through a bearing 9 one end of which is detachably mounted to the drum and the other end of which is fixedly mounted to a pulley 11, a pulse motor 15 directly coupled to a reduction gear 14, a pulley 13 fixedly mounted on an output shaft of the reduction gear 14, a toothed belt 12 received on the pulley 11 and a proximity switch 16 of a high accuracy type which is fixedly mounted in the head stock housing 10 for detecting a projection 11a mounted on a peripheral side of the pulley 11.

A roller 18 for measuring the outer peripheral length of the material wound on the drum 1 is rotatably mounted on one end of a lever 19. A known pulse generator (hereinafter referred to as PG) 22 is coupled with a shaft of the roller 18 and the PG is to generate pulses corresponding to the rotational quantity of the roller 18. The other end of the lever 19 is fixedly mounted to one end of a shaft 20 which is rotatably mounted on a bracket 21 fixed on the head stock housing 10. An air cylinder 17 (FIG. 4) is coupled with the other end of the shaft 20 and the lever 19 swings via the shaft 20 by the operation of the air cylinder 17.

A movable frame 23 is provided for the feeding unit 6, which is mounted on the fixed frame 3 slidable in the direction perpendicular to the axial core of the drum 1 by a known guide means not shown. A feed screw 25 which makes with an internal thread 24 fixedly mounted on the movable frame 23 has both ends which are rotatably mounted in bearings 26 fixed on the fixed frame 3 and is coupled with a geared motor 28 with a brake fixedly mounted on the frame 3 through a coupling 27. The movable frame 23 is moved in the direction perpendicular to the axial core of the drum 1 by operating the motor 28 and the amount of movement thereof is detected by the PG 29 mounted on the motor 28. Although not shown, there is also provided a limit switch for preventing the over-stroke of the movable frame 23.

There are further provided a belt conveyer 30 for feeding the rubber sheet, a drive roll 31, a chute 32 fixedly mounted on the movable frame 23 and a known cutter 33 mounted on the movable frame 23 for cutting the rubber sheet at a predetermined angle in the moving direction of the rubber sheet. The cutter 33 includes a round knife, a knife heater or the like depending on the construction of the rubber sheet and includes a drive means or the like although the latter is not shown.

A photo-electric switch 34 is mounted on the movable frame 23 for detecting a cut end 4b of the rubber sheet 4.

A movable frame 35 is mounted on the frame 23 and moves slidably in the direction perpendicular to the axial core of the drum 1 by operation of the air cylinder 37 (FIG. 4). A sponge roller 36 for pressing the rubber sheet 4 on the drum 1 is rotatably mounted on the movable frame 35.

The drive roll 31 is rotatably supported by bearings 40 mounted in the movable frame 23. A toothed belt 42 is provided between a pulley 41 mounted on one shaft of the drive roll 31 and a pulley 43 mounted on an output shaft of a pulse motor 44 fixedly mounted on the movable frame 23. Thus, by operating the pulse motor 44, the drive roll 31 is rotated to feed the rubber sheet 4.

The feed unit 7 has the same construction as the feed unit 6 except that the length of the belt conveyer is different and therefore further description thereof is not necessary. A sponge roller 38 is provided identical with the roller 36 and which can be moved to a position 38a by operation of the air cylinder 39 (FIG. 4). A pulse motor 45 for driving the belt conveyer, a geared motor 46 with a brake for moving a movable frame for the feeding unit 7 and a PG 47 for detecting the amount of movement of the movable frame are further provided.

A data processor 48 (FIG. 4) comprises a central processing unit (hereinafter referred to as CPU) for performing the data processing in accordance with a previously inputted program, a full keyboard for inputting data indicating the sequence of the molding operation, a Braun tube display unit (hereinafter referred to as CRT) for indentifying the inputted data, a CRT interface for transmitting and receiving signals between the keyboard and the CRT and the CPU, a digital switch for inputting a material number of the rubber sheet supplied to the rubber sheet feeding unit not shown, a memory circuit containing a read-only-memory (ROM) and a randam-access-memory (RAM) for storing the indication data and the like, and an input/output interface for transmitting and receiving signals between the CPU and the sequence circuit unit and the like. Further, it is convenient to add an external memory reading unit for reading the indication data from an external memory in which the indication data is stored previously and a printer for recording the resultant data of the molding operation. The keyboard, the CRT and the digital switch may be conveniently mounted in an operating control described later.

A sequence circuit unit 49 controls the operation of each unit and utilizes a programmable controller (generally named a sequencer) in this embodiment. An operating control 50 includes an automatic/manual selector switch, a push-botton switch for start and stop, an indicating lamp and the like. A counter 51 provides for counting the pulses generated fron the PG 22 during one rotation of the drum 1, that is first, until the proximity switch 16 is operated after the switch 16 is operated once. A pulse generator 53 is used to set the speed of rotation of the drum 1 at a time other than the winding time of the rubber sheet and including a device for setting the number of generated pulses per second. A digital switch 52 is provided for setting the amount of rotation of the drum 1 at a time other than the winding time.

A pulse generator 54 is utilized when the rubber sheet is wound on the drum and generates pulses at a predetermined number of generated pulses per second P/S until the number of generated pulses reaches a value designated by the data processor 48.

Frequency dividers 55 and 56 are provided for dividing the pulse signals generated from the pulse generator 54 in accordance with a frequency dividing data signal produced from the data processor 48 so as to automatically set a dividing ratio of the drum 1, a dividing ratio for the feeding conveyor 30, and the feeding quantity of the rubber sheet. More specifically, in order to synchronize the peripheral velocities of the cylindrical drum and the feed conveyor, in FIG. 4, the number of pulses which are output from the pulse generator 54 is frequency demultiplied by the frequency dividers 55 and 56 so as to have a predetermined peripheral velocity ratio, and the results are input to the pulse motor drivers 61, 62 and 63. To achieve this, the frequency demultiplying ratio necessary for the demultiplying is calculated in the data processor and is outputted from it. The "dividing ratio" refers to this frequency demultiplying ratio. The data processor is adapted to calculate and output each dividing ratio so that, in order to synchronize the peripheral velocities of the drum 1 and the feeding conveyor 30, the speed of each respective driving motor can be controlled so as to control the dividing ratio of the pulse frequency dividers 55 and 56 shown in FIG. 4. A digital switch 57 sets the quantity of feed of the rubber sheet by the feed conveyer at a time other than when the rubber sheet is wound in preparation for winding the rubber sheet on a subsequent drum, and a pulse generator 59 is used with the digital switch 57 and includes a P/S setting device.

A relay circuit unit 59 selects the pulse signal of the pulse generator 53 or the frequency divider 55. A relay circuit unit 60 selects the pulse signal of the pulse generator 58 or the frequency divider 56 and performs the control operation for selectively feeding the rubber sheet 4 or 5. A pulse motor driver 61 is provided responsive to the output pulse signal of the relay circuit unit 59 for driving a pulse motor 15 and pulse motor drivers 62 and 63 are responsive to the output pulse signal of the relay circuit unit 60 for driving pulse motors 44 and 45, respectively.

AC motor control units 64 and 65 are provided for the geared motors 28 and 46 with an AC alternating current magnetic brake, respectively, and include a comparison circuit for a stroke setting signal produced from the data processor and a position detection pulse signal produced from the PG 29 and 47. The expression "stroke setting signal" means a signal for setting the distance of movement of the movable frame 23 of the feed conveyor 30 from its waiting position. Due to this signal, the motor 28 is driven and the movable frame 23 is moved for a predetermined distance in a direction at right angles to the axial core of the drum 1.

A pneumatic control device 66 is provided for air cylinders 17, 37 and 39 and includes a solenoid operated valve and a pressure reducing valve.

Further, the controller comprises a limit switch, a proximity switch, a photo-electric switch and the like for detecting the operating condition of the movable frames and the air cylinders and a driving circuit for the rubber sheet feeding device, although not shown.

The present invention will now be described by way of example with reference to the formation of the V belt to which the present invention is applied.

Concerning all types of V belts which are planned to be formed by the present controller, the specification data including the type number V and the peripheral length L for each V belt, the material number Mn of the rubber sheet to be used in the winding operation, the thickness Mt of the rubber sheet and the number of wound layers $M_l$ corresponding to the grade number M (indicates quality of product) and the number D or kind of the used drum, the material number Mn of rubber sheet supplied to the servicer, the supply location thereof P (the feeding device number) and mechanical data described later are inputted and stored in the data processor 48. Before starting the formation of the belt, the designation data including the formation order N, the type number V, the peripheral length L and the grade number M of the V belt to be formed in a predetermined time period are inputted to the data processor 48 and the operating control 50 is then operated to start automatically.

The sequence circuit unit 49 then produces a data request signal to supply it to the data processor 48. When the data processor 48 identifies in response to the data request signal that the counter memory in the memory circuit is N, the CPU selects the type number V, the peripheral length L and the grade number M of the V belt of the formation order N on the basis of the designation data in the memory circuit to select the specification data corresponding to the selected designation data and performs the next operation.

The forward stroke data signal or stroke setting signal which is precalculated and its value input into the data processor for the feeding unit 6 and/or 7 is given by $$X_1 = a_1 - b_1\sqrt{(L+c_1)^2 - d_1^2}$$

where $a_1$, $b_1$, $c_1$ and $d_1$ are mechanical data which are calculated by the following equations and inputted previously (the data for the feeding units 6 and 7 are required to be calculated and inputted independently).

$a_1 = k_1(S_1 - s_1)$, $b_1 = k_1/2\pi$, $c_1 = 2\pi r$, $d_1 = 2\pi h$ $k_1$; the number of pulse trains generated by the PG's 29 and 47 when the feeding units 6 and 7 are moved a unit distance.

$S_1$; the horizontal distance between the center of the drum 1 when the feeding units 6 and 7 are in a wait position and the center of the sponge rolls 36 and 38 being in the wait position.

$s_1$; the proper pressing stroke of the sponge rolls 36 and 38.

r; the radius of the sponge rolls 36 and 38.

h; the difference in height between the center of the drum 1 and the center of the sponge rolls 36 and 38. The expression "proper pressing stroke" means the distance of movement of the movable frame 23 so as to properly press the sponge rolls 36 and 38 on the surface of the drum 1 (its optimum value is predetermined by testing).

The results to be calculated by the following equation are previously set to the digital switch 57 as for the feeding units 6 and 7, respectively.

The feeding length of the rubber sheet 4 and/or 5 is given by $$X_2 = k_2(L_0 - S_2)$$

$k_2$; the number of output pulses supplied to the pulse motors 44 and 45 required to cause the feeding units 6 and 7 to feed the rubber sheets 4 and 5 a unit distance.

$L_o$; the length of the end 4b of the rubber sheet fed from the cutting position of the rubber sheet 4 by the cutter 33 before starting the winding operation (this length is previously inputted to the data processor 48 as a mechanical data).

$S_2$; the distance between the cutting position of the rubber sheet 4 by the cutter 33 and the detection position by the photo-electric switch 34.

The data processor 48 supplies the above calculated result X, to the AC motor control units 64 and 65 and supplies the signal of the location number P (for example 6) supplied with the rubber sheet having the used material number Mn to the sequence circuit unit 49. The sequence circuit unit 49 thus sends the start signal to the AC motor control unit (for example, the AC motor control unit 64) and starts the measurement of the peripheral length.

When the start command is supplied to the AC motor control unit 64, the feed screw 25 is rotated through the geared motor 28 with brake to move the feeding unit 6 forward (to approach the drum 1). When the number of the pulses generated by the PG 29 reaches the above value $X_1$, the forward movement of the feeding unit 6 is stopped and the stroke completion signal is supplied to the sequence circuit unit 49. Thus, the sequence circuit unit 49 causes the relay circuit unit 60 to select the pulse generator 58 and the pulse motor driver 62 and supplies the pulse generation command to the pulse generator 58 so that the feeding conveyer 30 is operated through the pulse motor 44 to feed the rubber sheet 4. When the number of pulses generated from the generator 58 after the end 4b of the rubber sheet 4 has been detected by the photo-electric switch 34 reaches the value $X_2$ preset to the digital switch 57 (FIG. 3(A)), the feeding conveyer 30 is stopped and the pulse generator 58 supplies the feeding completion signal to the sequence circuit unit 49.

On the other hand, the peripheral length of the drum is measured during the above operation. The sequence circuit unit 49 first operates the air cylinder 17 through the pneumatic control device 66 to bring the peripheral length measuring roller 18 into contact with the surface of the drum 1 (or the surface of the rubber sheet wound on the drum). The relay circuit unit 59 is caused to select the pulse generator 53 to start the generation of pulses and the drum 1 is rotated through the pulse motor driver 61 and the pulse motor 15. When the proximity switch 16 operates, the counter 51 starts to count the pulses of the PG 22 and when the proximity switch 16 operates next, the counter 51 stops to count the pulses of the PG 22 and the resultant count signal $X_3$ is supplied to the data processor 48 with the count completion signal being supplied to the sequence circuit unit 49. The sequence circuit unit 49 stops the rotation of the drum 1 and returns the air cylinder 17 to its original position to terminate the measurement of the peripheral length.

The data processor 48 performs the following calculation on the basis of the measured peripheral length data signal $X_3$.

| | |
|---|---|
| Measured peripheral length | $L_n = a_3 X_3$ |
| Dividing Ratio for the Drum | $K_D = a_4/Z_D$ |
| Dividing Ratio for the Conveyer | $K_c = a_5/(L_{Di} \times Z_D)$ |

$i = 1, 2, \ldots$ : winding order (sequential winding number)

$L_{D1} = L_n + \pi(Ml_1 \times Mt_1) \times \alpha_1$ $L_{D2} = L_n + 2\pi(Ml_1 \times Mt_1) + \pi(Ml_1 \times Mt_2) \times \alpha_2$ Wound rotational quantity $X_4 = a_6 \left( Ml_i - \dfrac{L_o}{L_{Ei}} \right)$ $i = 1, 2, \ldots$ : winding order $L_{E1} = L_n + 2\pi(Ml_1 \times Mt_1) + \beta_1$ $L_{E2} = L_n + 2\pi(Ml_1 \times Mt_1) + 2\pi(Ml_2 \times Mt_2) + \beta_2$ where $\alpha_i$ and $\beta_i$ represent correction coefficients or coefficients for compensation on the basis of the characteristics and the lap area or width of overlapping of the rubber sheet, and $Z_D$ represents the speed of rotation (RPM) of the drum when the rubber sheet is wound. The term characteristics is meant to represent physical characteristics, such as elongation of the unvulcanized rubber sheet and the expression lap area means the width or length by which the rubber sheet overlaps itself when wound around the cylindrical drum. These data are previously inputted as the specification data. Further, the data $a_3$, $a_4$, $a_5$ and $a_6$ are the mechanical data calculated by the following equations and previously inputted. It is practically convenient to introduce the above-mentioned correction coefficients in the following formulas: $a_3$, $a_4$, $a_5$ and $a_6$.

$a_3 = \pi d/k_3$, $a_4 = 60H/k_4$, $a_5 = 60H/a_2$, $a_6 = K_D \cdot k_4$ d; diameter of the roller 18 for measuring the peripheral length $k_3$; number of pulses generated by the PG 22 for one rotation of the roller 18

H; P/S of the pulse generator 54

$k_4$; number of pulses supplied to the pulse motor 15 required for one rotation of the drum 1

By the above-mentioned dividing ratio is meant a ratio of normal speed (r.p.m.) of a driving motor due to the pulse signal of the pulse generator 54 to the actual speed (r.p.m.) of the driving motor of the drum or conveyer. Thus, the dividing ratio represents a pulse repetition frequency dividing ratio for each driving motor (pulse motor).

After the above calculation is completed, the signal $K_D$, $K_c$ and $X_4$ are supplied to the frequency divider 55, 56 and the pulse generator 54, respectively, and the calculation completion signal is supplied to the sequence circuit unit 49. In accordance with the feeding completion signal and the calculation completion signal for the rubber sheet 4, the sequence circuit unit 49 causes the relay circuit unit 59 to select the frequency divider 55 and the relay circuit unit 60 to select the frequency divider 56 and the pulse motor drive 62. At the same time, the air cylinder 37 is operated through the pneumatic control circuit 66 to move the sponge roller 36 so that the end 4b of the rubber sheet 4 is pressed and adhered to the surface of the drum 1 (FIG. 3(B)). Thereafter, the pulse generation command is supplied to the pulse generator 54 and the pulse motors 15 and 44 are driven in synchronism with each other through the frequency dividers 55 and 56, the relay circuit units 59 and 60, and the pulse motor drivers 61 and 62 to wind the rubber sheet 4 on the drum 4. When the number of pulses generated by the pulse generator 54 reaches $X_4$ (FIG. 3(C)), the pulse motors 15 and 44 are stopped and the winding completion signal is produced to the sequence circuit unit 49. Thus, the sequence circuit unit 49 controls the cutter 33 through a circuit not shown to cut the rubber sheet 4. Then, the pulse generator 54 is operated for a predetermined time to drive only the pulse motor 15 through the frequency divider 55, the relay circuit unit 59 and the pulse motor driver 61. After the remaining portion of the rubber sheet 4 is wound, the feeding unit 6 is returned to the wait condition and the winding process is terminated.

In accordance with the specification of the V belt, further layers of the rubber sheet 5 may be wound by the same operation.

When all the winding process is terminated, the sequence circuit unit 49 produces the end signal to the data processor 48 and causes the data processor 48 to perform the next process, that is, the exchange of the drum and the like. In the data processor 48, the counter memory in the memory circuit is incremented by 1 to be (N+1).

Although the above description has been made to the V belt by way of example, the formation of the flat belt or the like can be made in the same manner if the formation includes the process of winding the unvulcanized rubber sheet on the drum.

In the above embodiment, although only the pulse motor 15 is provided for rotating the drum 1, other equipments are provided in many cases and stitching and cutting operations are performed while rotating the drum 1. In such a case, it is advantageous in a cycle time that another motor is provided which is switched with the pulse motor 15 through a clutch to rotate the drum 1. In the case where the additional motor is switched through the clutch to rotate the drum 1 and the rotation of the drum 1 for measuring the peripheral length is made by the additional motor, the pulse generator 53 and the relay circuit unit 59 are removed in the circuit of FIG. 4 and the frequency divider 55 may be directly coupled with the pulse motor driver 61.

Further, although the pulse motors are used to drive both the drum 1 and the conveyer for the feed units 6 and 7, one of them may be a DC servomotor, a DC motor with PG, an AC motor with PG or a pulse motor and the other may be a DC servomotor. In such a case, while the circuit of FIG. 4 is partly changed to be suitable for such a motor drive circuit, the variation is simple to those skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A controller for winding an unvulcanized rubber sheet which comprises a cylindrical drum for winding said unvulcanized rubber sheet on said cylindrical drum, a motor for rotating said drum, at least one feed conveyor for feeding said unvulcanized rubber sheet to said drum, a motor for driving said at least one feed conveyor, means for measuring an outer peripheral length of said drum before and during winding of said unvulcanized rubber sheet, a data processor for calculating the amount of winding rotation of said drum for winding said unvulcanized rubber sheet on said drum based on previous data inputted to said processor regarding certain specification data, mechanical data and designation data and said measured outer peripheral length of said drum before and during winding of said unvulcanized rubber sheet and for calculating a dividing ratio for said drum and a dividing ratio for said conveyor respectively so as to synchronize peripheral velocities of said drum and said feeding conveyor and to output said dividing ratios, said dividing ratios being defined as the ratio of the peripheral velocity of said drum and the peripheral velocity of said conveyor to the feed quantity of a rubber sheet, and a sequence control unit for controlling the sequence of operation of each of said aforesaid motors to be driven in response to operation data calculated and outputted from said data processor, including the amount of winding rotation of said drum and said dividing ratios, said sequence of operation referring to that sequence according to which each element of the controller for winding the unvulcanized rubber sheet and motors are operated, which sequence is established according to a predetermined order.

2. The controller of claim 1, wherein said calculated amount of winding rotation of said unvulcanized rubber sheet on said drum provided by said data processor includes a compensation for characteristics such as the physical characteristic elongation of said unvulcanized rubber sheet and overlapping width or length of said unvulcanized rubber sheet wound around said cylindrical drum.

* * * * *